P. L. LEISSE.
ELECTRIC SWITCH.
APPLICATION FILED DEC. 1, 1913.

1,248,508.

Patented Dec. 4, 1917.

WITNESSES

INVENTOR

UNITED STATES PATENT OFFICE.

PIERRE LÉONARD LEISSE, OF BILLANCOURT, FRANCE, ASSIGNOR TO LOUIS RENAULT.

ELECTRIC SWITCH.

1,248,508.  Specification of Letters Patent.  Patented Dec. 4, 1917.

Application filed December 1, 1913. Serial No. 803,990.

*To all whom it may concern:*

Be it known that I, PIERRE LÉONARD LEISSE, citizen of the French Republic, residing at Billancourt, Department of the Seine, in France, have invented certain new and useful Improvements in Electric Switches; and I do hereby declare the following to be a full, clear, and exact description of the invention, such as will enable others skilled in the art to which it appertains to make and use the same.

This invention relates to electric switch mechanism for use in combination with variable speed dynamo-electric machines to maintain the voltage of the dynamo substantially constant and to throw the dynamo into and out of circuit with a storage battery or other piece of electrical apparatus, in accordance with the voltage variations of the dynamo.

The object of the invention is to provide switch mechanism of the foregoing type, which is simple in construction, compact and self-contained, whereby it may be readily applied as a structural unit directly to the dynamo, if so desired. A further object of the invention is to so associate the independent controlling switches with the mechanism as to render each of the same capable of being readily disassociated with the remaining structure for necessary repairs or for replacement by similarly constructed parts.

In furtherance of these and other objects, which will appear as the specification proceeds, the invention consists in the novel construction and combination of parts hereinafter set forth.

The invention is illustrated in the accompanying drawing, in which:—

Figure 2:
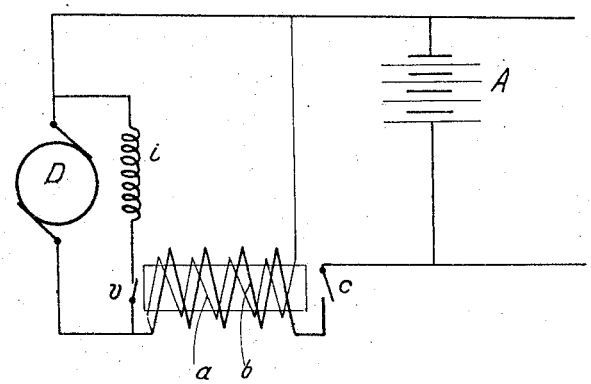
Fig. 2 is a diagrammatic view illustrating the use to which the switch mechanism is put and the functions of the switches.

Referring first to Fig. 2, it will be seen that the switch mechanism comprises two switches, one of which is shown at $v$ and controls the passage of the current through the shunt field winding $i$ of the dynamo represented at D. The switch $v$ is magnetically controlled by means of a coil $a$ wound upon a suitable core and connected in shunt relation with the dynamo. As the voltage of the dynamo increases, due to the increased speed thereof, the switch $v$ will be opened, as the magnetic strength of the coil $a$ will increase. This will cut out the exciting current in the field coil $i$ until the voltage of the dynamo is sufficiently reduced to allow the spring mechanism, hereinafter described, to again close the switch $v$. A second switch $c$ is adapted to be magnetically closed by a coil $b$ connected in series with the dynamo. The switch $c$ will only close when a predetermined voltage is attained, at which time, the dynamo will be connected with the storage battery A. If the voltage of the dynamo falls below a predetermined minimum, the switch $c$ will open until the dynamo voltage again becomes sufficient to warrant the connection of the dynamo with the storage battery.

Figure 1:
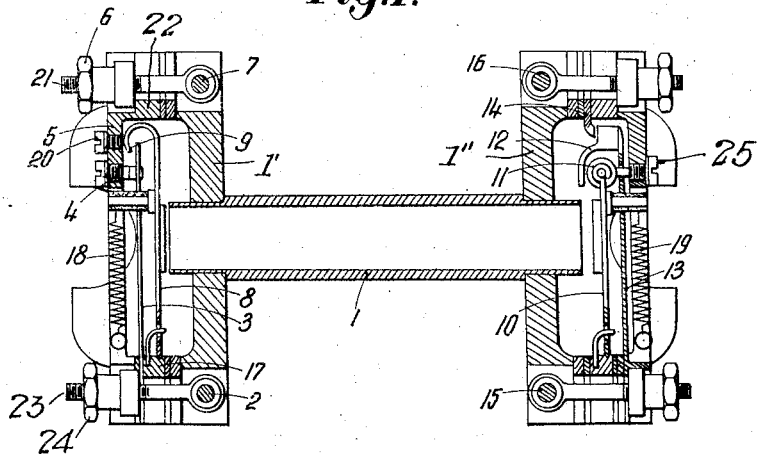
Figure 1 is a vertical section of the improved switch mechanism.

The switch mechanism is shown in detail in Fig. 1, and comprises a core 1, upon which the coils $a$ and $b$ are adapted to be wound. At one end, the core 1 has associated therewith, a switch support 1', and at the other end it has associated therewith, a similar and second switch support 1".

The switch support 1' removably carries a switch block upon which all of the switch mechanism is mounted. The switch block for the support 1' is shown at 22, and is normally held in place by means of the swinging bolts 21 and 23 pivotally mounted on the support at 7 and 2, respectively. These bolts when swung to the position shown in Fig. 1, are capable of retaining the switch block 22 in place by means of the clamp nuts 6 and 24.

The switch block 22 has mounted thereon, an armature 8 having a lower knife-edge engaging in a corresponding recess in the block 22, as will be clear from Fig. 1. By this means, the armature is permitted to freely vibrate when attracted and released by the magnetic coil. The armature 8 is retained in the normal position shown in Fig. 1, by means of a coil spring 18. The upper extremity of the armature 8 is bent to the shape shown in Fig. 1, so that when the armature is attracted, the bent extremity will engage the upper end of a switch member 2. The continued movement of the armature 8 will then serve to break the electrical contact between the switch member 3 and the contact screw 4. In the normal closed position of the switch 3, the electric current enters at 2, passes through the bolt 23 thence through the switch member 3, contact screw 4, switch block 22, bolt 21, and back to the source from the point 7. When the magnet is sufficiently energized by the increased voltage of the dynamo, the armature 8 will be shifted and will have an idle movement until the extremity 9 of the armature engages with the switch member 3, at which time the electric contact at 3—4 will be suddenly broken, and the current will discontinue to flow through the field coil $i$. When the strength of the magnet decreases, due to the decrease in voltage of the dynamo, the spring 18 will serve to return the switch member 3 to its original position, thereby permitting electric current to again flow through the exciting field coil $i$.

The structure of the switch mechanism carried by the support 1″ for controlling the connection between the dynamo and the storage battery differs from the switch mechanism just described, in that the armature 10, corresponding to the armature 8 above described, carries at its upper end, an insulated roller 11. A spring 10, corresponding to spring 18, serves to retain the armature 10 in the normal position shown in Fig. 1. The switch member 13, in this instance, has a downwardly projecting extremital portion 12 designed to be engaged by the roller 11, after a predetermined movement of the latter. An increase in the magnetic strength of the coil $b$ will cause the armature 10 to be attracted to the magnet core 1, and when the roller 11 engages with the projection 12, the upper extremity of the switch member 13 will make frictional engagement with the electric contact member 14. Current will then pass from the point 15, through the switch member 13, contact member 14, to the point 16, and from here to the storage battery A. When the magnetic strength of the coil B decreases, the spring 19 will return the switch member 13 to its original position, and thereby disconnect the dynamo D from the storage battery A.

It will, therefore, be noted that the switch mechanism carried by the switch support 1, corresponding to the switch diagrammatically shown at $v$, opens when the dynamo voltage becomes excessive, and as a result of the opening of the switch $v$, the voltage of the dynamo will decrease. When the dynamo voltage increases to a predetermined amount, the switch mechanism carried by the support 1″, corresponding to the switch diagrammatically shown at $c$, will close and connect the dynamo with the storage battery, but when the voltage of the dynamo falls below a predetermined minimum, the switch mechanism $c$ will automatically open, as the magnetic strength of the coil $b$ will not be sufficient to prevent the spring 19 from opening the switch.

Instead of adjusting the springs 18 and 19 to regulate the movements of the armatures 8 and 10, respectively, suitable adjusting screws 20 and 25 are provided, capable of adjusting the position of the armature with respect to the magnet core 1. When the armatures are in relatively close relation with the magnet core, it is obvious that they will be actuated by a smaller voltage than would be required if the armatures were adjusted far from the magnet core. The contact screw 4 may also be adjusted, and this adjustment will coöperate with the adjustment of the screw 20 in determining the voltage at which the switch member 3 will be operated.

From the foregoing description, it will be seen that the parts may be so set that the switches will not be operated by slight voltage variations, if such a condition is desired. In fact, the switch $c$ is, in the present instance, designed to close only at a relatively high voltage so that the dynamo will not be connected with the storage battery until sufficient voltage is obtained. It will also be seen that both switches are combined with the magnet core 1, so as to form a structural unit, which, if desired, may be applied directly to the dynamo.

Furthermore, the switch mechanism at each end of the core 1 is carried by a switch block, which may be readily removed if the switch needs adjusting, or if it becomes inoperative, and the removed block may be replaced by a new one carrying similar switch mechanism whose parts have been properly adjusted. The same switch block may, of course, be replaced after the necessary repairs or adjustments are made. The entire switch mechanism at each end of the core 1 is carried by the corresponding switch block, which, when removed, permits free access to the switch parts, and which, when replaced, brings the switch mechanism into proper relation with the magnet core.

The construction of the switch mechanism renders the same especially adapted for use in combination with dynamos used on motor vehicles, as in this case, the dynamo receives its motion from the vehicle and is driven at variable speeds, which necessitate the use of controlling mechanism of the type herein described.

Obviously numerous changes may be made in the details of the construction, without departing from the spirit or scope of the invention, as defined in the accompanying claim.

What I claim is:—

An electric switch of the kind described, comprising a core on which an electro-magnetic coil is adapted to be wound, a switch support associated with the end of the core, a switch box removably carried by said support, and having bolt-receiving recesses, retaining bolts pivoted to said support adapted to swing into and out of said recesses and having nuts for retaining the switch box on the support and switch mechanism carried by said box comprising an element adapted to be magnetically operated by said coil and so disposed as to lie in operative relation with the extremity of said core when the switch box is positioned on the support, said bolts constituting circuit - completing means to said switch mechanism.

In testimony whereof I affix my signature, in presence of two witnesses.

PIERRE LÉONARD LEISSE.

Witnesses:
HANSON C. COXE,
EMILE KLOTZ.

Copies of this patent may be obtained for five cents each, by addressing the "Commissioner of Patents, Washington, D. C."